(12) United States Patent
Takahashi

(10) Patent No.: US 6,683,736 B2
(45) Date of Patent: Jan. 27, 2004

(54) METHOD DETECTING A FAULT OF A MAGNETIC RECORDING HEAD, AND A MAGNETIC RECORDING DEVICE

(75) Inventor: Yasuhiko Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 401 days.

(21) Appl. No.: 09/738,161

(22) Filed: Dec. 15, 2000

(65) Prior Publication Data

US 2001/0010602 A1 Aug. 2, 2001

(30) Foreign Application Priority Data

Feb. 2, 2000 (JP) ........................................ 2000-025060

(51) Int. Cl.⁷ .......................... G11B 27/36; G11B 21/02
(52) U.S. Cl. ............................................ 360/31; 360/75
(58) Field of Search .............................. 360/31, 25, 66, 360/75

(56) References Cited

U.S. PATENT DOCUMENTS

| | | | | |
|---|---|---|---|---|
| 5,982,568 A | * | 11/1999 | Yamamoto et al. | ........... 360/31 |
| 6,014,282 A | * | 1/2000 | Ito | ............................... 360/75 |
| 6,043,945 A | * | 3/2000 | Tsuboi et al. | .................. 360/53 |
| 6,069,760 A | * | 5/2000 | Yun | ............................. 360/53 |
| 6,141,162 A | * | 10/2000 | Kotani | ........................ 360/46 |

FOREIGN PATENT DOCUMENTS

| | | |
|---|---|---|
| JP | 08-55304 | 2/1996 |
| JP | 11-16131 | 1/1999 |
| JP | 11-242836 | 9/1999 |

* cited by examiner

*Primary Examiner*—Regina N. Holder
(74) *Attorney, Agent, or Firm*—Greer, Burns & Crain, Ltd.

(57) ABSTRACT

An electric current for writing low-frequency test data, or a direct current is applied to a magnetic recording head at a time point when data is not actually recorded, and a proper/improper operation of the magnetic recording head is detected by determining whether or not the terminal voltage of the head is within a predetermined range.

12 Claims, 10 Drawing Sheets

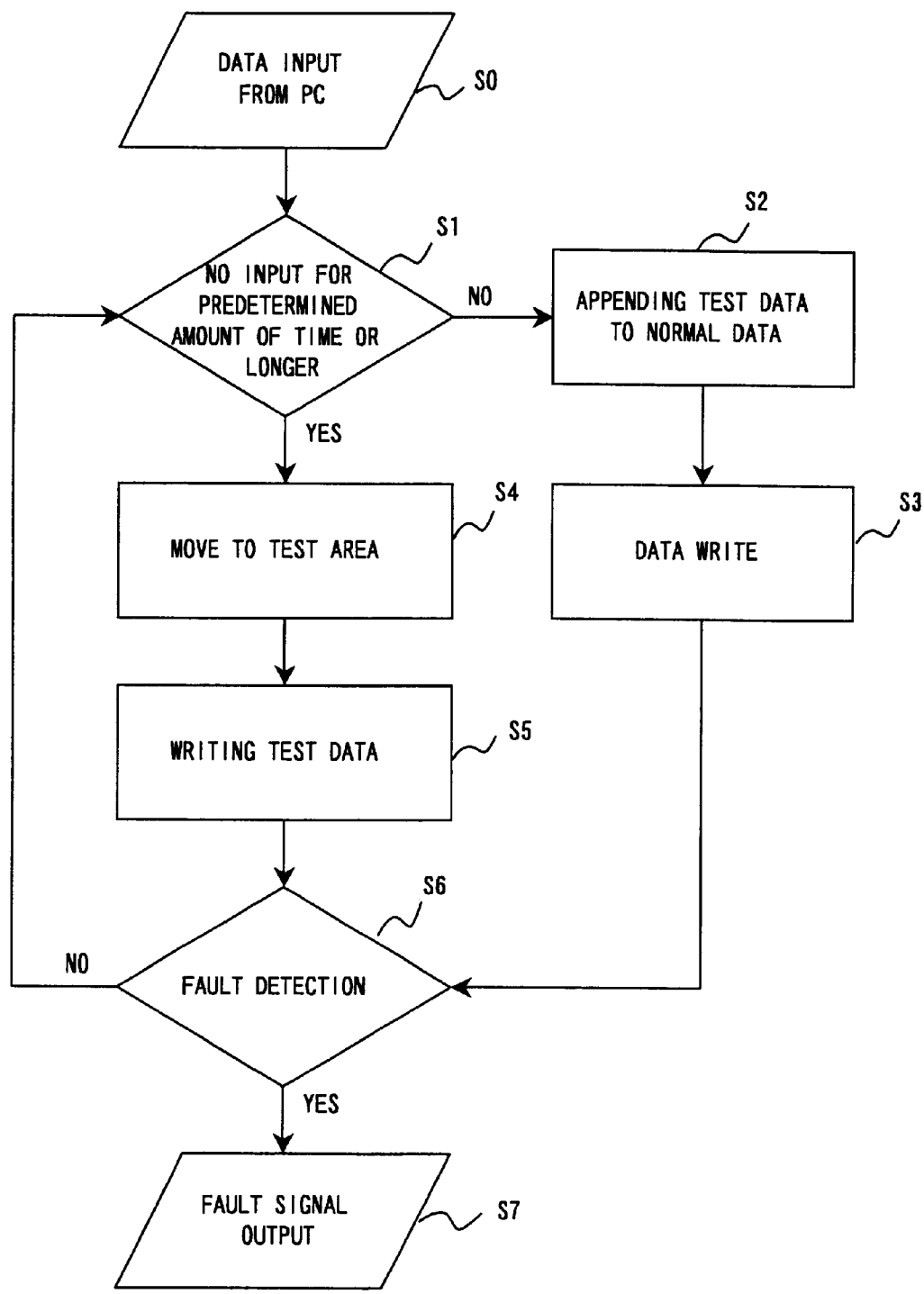
F I G. 5

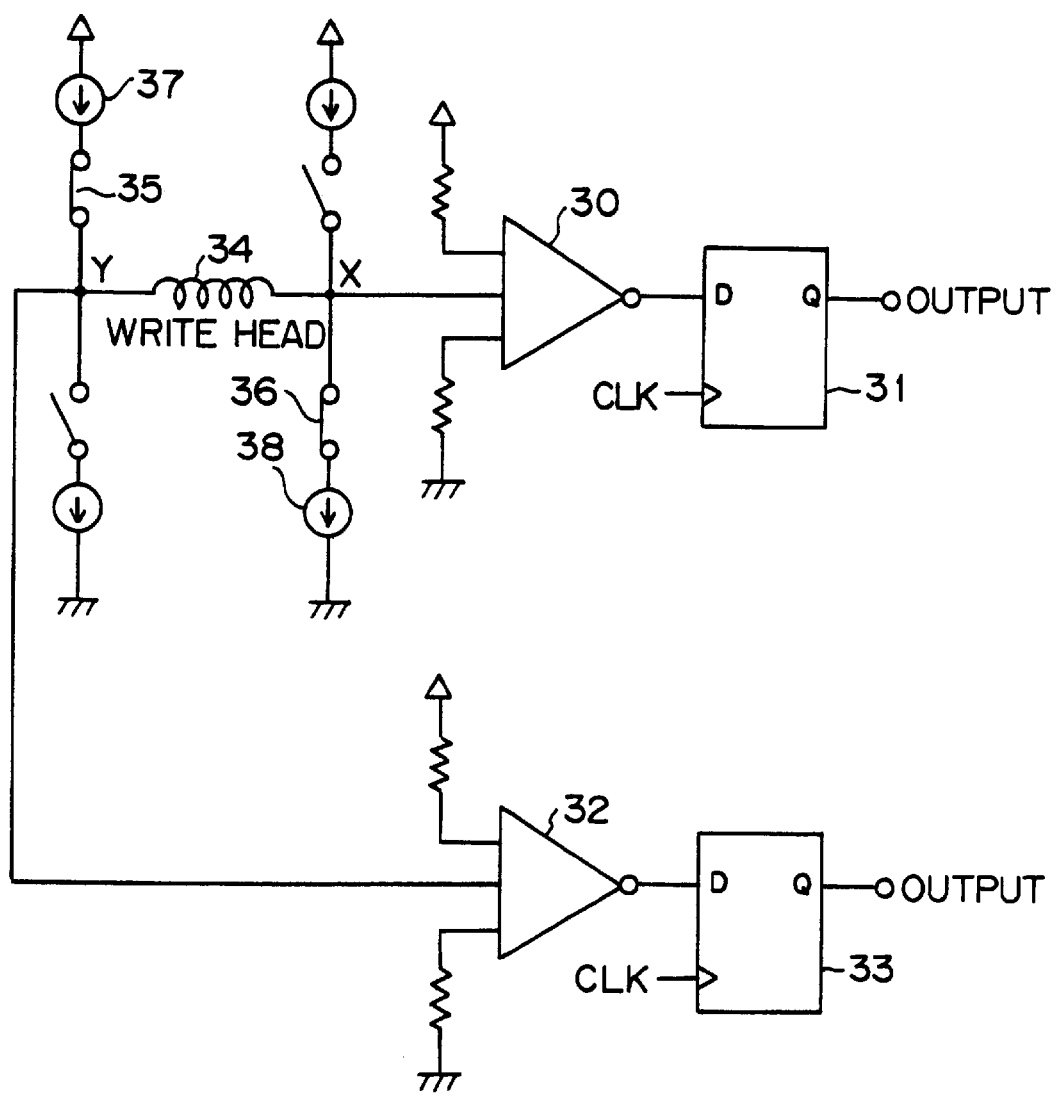
F I G. 9

METHOD DETECTING A FAULT OF A MAGNETIC RECORDING HEAD, AND A MAGNETIC RECORDING DEVICE

BACKGROUND OF THE INVENTION

1. Field of the Invention

The present invention relates to a magnetic recording device, and more particularly, to a method detecting a fault such as an open circuit, a short circuit, etc. of a magnetic recording head such as a hard disk, etc.

2. Description of the Related Art

For a conventional magnetic recording device, a fault such as an open circuit, a short circuit, etc. of a magnetic recording head is detected by monitoring its terminal voltage when the magnetic recording head actually writes data. FIGS. 1A and 1B are schematic diagrams explaining the conventional fault detecting method. In FIG. 1A, a rectangular wave is a voltage representing actual written data, whereas a wave indicated by a curved line is the terminal voltage of a head. Normally, there is a tendency such that a transient change (flyback) such as an overshoot, etc. occurs in the terminal voltage of the head at a time point when data is changed, and settles to a rectangular wave value thereafter.

In FIGS. 1A and 1B, levels 1 and 2 are two levels to detect a fault of the head. If the rectangular wave voltage corresponding to the data is equal to or lower than the level 1, the head is detected to be short-circuited. If the voltage is equal to or higher than the level 2, the head is detected to be open. In FIG. 1A, the voltage at a fault detection time point (1) is between the levels 1 and 2, and it is properly detected that the head is not faulty.

In FIG. 1B, the frequency of written data becomes high, so that the time period during which the terminal voltage of the head remains at a rectangular wave voltage becomes very short after an overshoot occurs, and the data is immediately inverted. Accordingly, if the terminal voltage of the head is monitored, for example, at a time point (2), the value of the monitored voltage is determined to be equal to or higher than the level 2 although the head actually performs proper operations. As a result, it is determined that a fault occurs in the head, that is, an open circuit of the head is determined to occur. This is because the frequency of written data is higher than that in FIG. 1A.

A flyback period during which a transient change such as an overshoot occurs in the terminal voltage of a head is determined by the inductance of a write coil of the head. Therefore, the flyback period remains nearly constant regardless of the frequency of written data. Consequently, the time period during which the voltage remains at a certain level of a rectangular wave becomes much shorter than that in FIG. 1A after the flyback period elapses, so that it becomes impossible to properly detect a fault of the head.

FIGS. 2A and 2B explain a problem that the short circuit of a head cannot be properly detected. In FIG. 2A, the terminal voltage of the head is almost "0" which indicates a short circuit after the flyback period elapses, and the short circuit of the head can be properly detected by monitoring the voltage at a time point (3).

In the meantime, since the frequency of written data becomes higher in FIG. 2B, the time period during which the terminal voltage of the head is lower than the level 1 becomes very short. Accordingly, if the voltage is monitored, for example, at a time point (4), the short circuit of the head cannot be detected, and fault detection cannot be properly made.

If the margin between the flyback period and the data inversion cycle becomes smaller with an increase in the speed of a magnetic recording device as described above, a fault such as an open or a short circuit of the magnetic recording head cannot be properly detected when a fault is detected by monitoring the terminal voltage of the head, which corresponds to the written data. As a result, the data write operation is determined to be proper, and the data is written, leading to a data loss.

SUMMARY OF THE INVENTION

An object of the present invention is to allow a fault of a magnetic recording head to be properly detected even if the frequency of written data becomes higher with an increase in the speed of a magnetic recording device.

With a method detecting a fault of a magnetic recording head of a magnetic recording device according to the present invention, an electric current for writing low-frequency test data or a direct current is applied to a magnetic recording head at a time point when data is not actually recorded, and a proper/improper operation of the magnetic recording head is detected by determining whether or not the terminal voltage of the magnetic recording head is within a predetermined range.

By performing the process detecting a fault of a magnetic recording head at a time point when data is not actually recorded as described above, a fault can be properly detected even if the data write speed of a magnetic recording device is high.

BRIEF DESCRIPTION OF THE DRAWINGS

FIG. 5 is a flowchart showing the entire process of the fault detecting method according to the present invention;

FIG. 9 exemplifies the configuration of a fault detecting circuit of the magnetic recording head.

DESCRIPTION OF THE PREFERRED EMBODIMENTS

First of all, the principle of the present invention is described.

Figure 3:
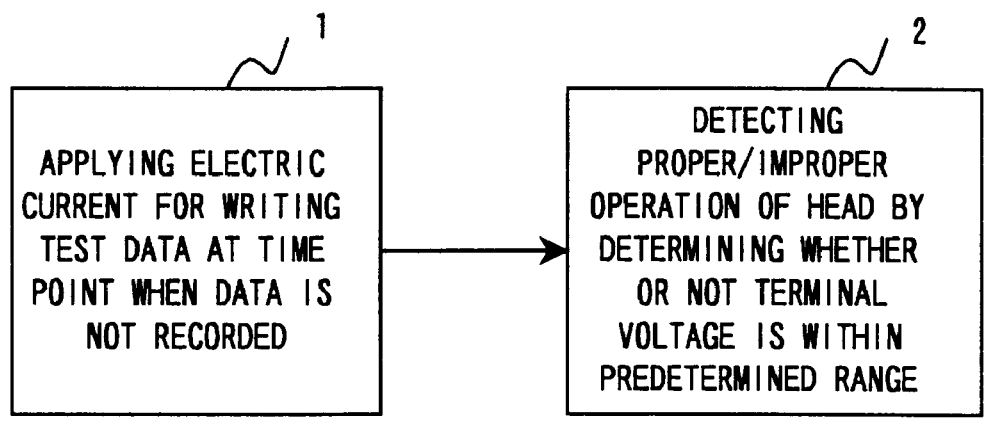
FIG. 3 is a block diagram showing the functions according to the present invention.

FIG. 3 is a block diagram showing the functions according to the present invention.

This figure shows the functions of the method detecting a fault of a magnetic recording head of a magnetic recording device.

Figure 1A:
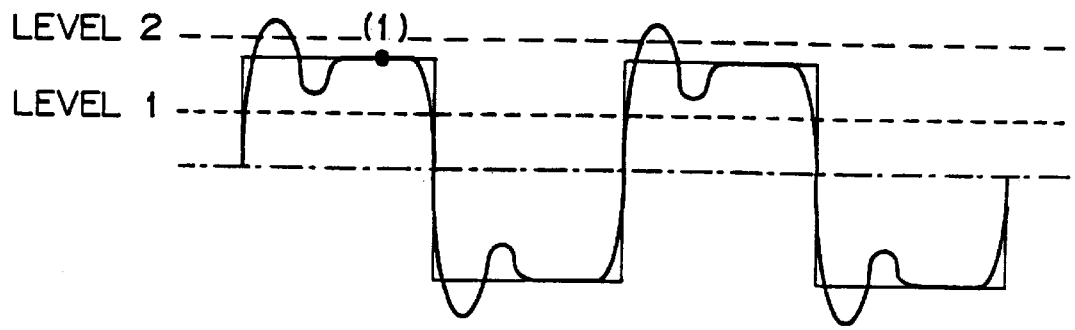
FIGS. 1A and 1B are schematic diagrams explaining the conventional method detecting a fault of a magnetic recording head.
Figure 1B:
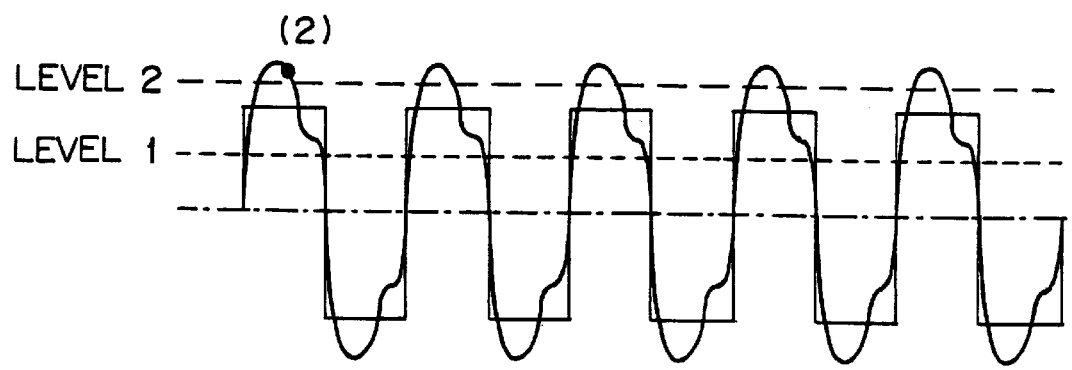
Figure 2A:
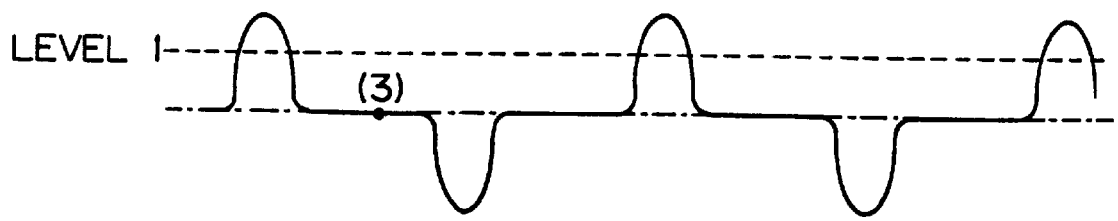
FIGS. 2A and 2B are schematic diagrams exemplifying a conventional method detecting a short-circuit as a fault of a magnetic recording head.
Figure 2B:
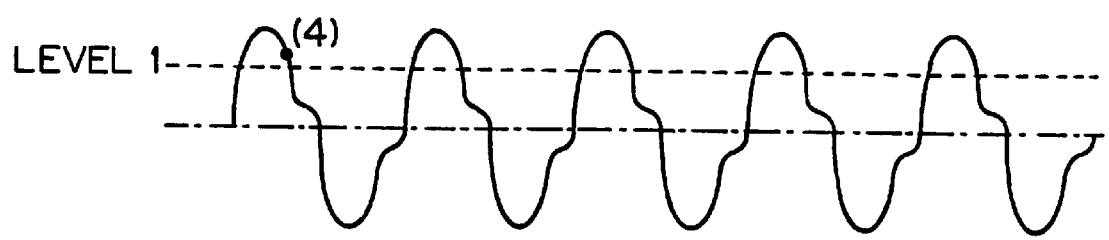

With the method detecting a fault of a magnetic recording head according to the present invention, in "1", an electric current for writing low-frequency test data is applied to a magnetic recording head at a time point when data is not actually recorded, and in "2", the proper/improper operation of the magnetic recording head is detected by determining whether or not the terminal voltage of the magnetic recording head is within a predetermined range, for example, between the levels 1 and 2 explained by referring to FIGS. 1A and 1B.

In a preferred embodiment according to the present invention, the time point when the electric current for writing test data is applied to a magnetic recording head may also be a time point when the magnetic recording head stays in a gap within a sector of a magnetic recording medium such as a magnetic disk.

Or, the time point when the electric current for writing test data is applied may also be a time point when the magnetic recording head stays in a sector, for example, if the sector is used as a dummy position for writing test data onto a magnetic storage medium.

Or, the time point when the electric current for writing test data is applied may be a time point before a magnetic recording head moves onto a magnetic recording medium when a magnetic recording device starts up.

Or, the time point when the electric current for writing test data is applied may also be a time point after accesses are not made to a magnetic recording device for a predetermined amount of time or longer, and a magnetic recording head moves to a refuge position (standby position).

With the method detecting a fault of a magnetic recording head according to the present invention, it is also possible to detect the proper/improper operation of a magnetic recording head by applying a direct current to a magnetic recording head at a time point when data is not actually recorded, and by determining whether or not the terminal voltage of the magnetic recording head is within a predetermined range.

In this case, the time point when a direct current is applied to a magnetic recording head may be a time point when the magnetic recording head stays in a gap within a sector of the magnetic recording medium, a time point when the magnetic recording head stays at a dummy position for writing test data on the magnetic recording medium, a time point before the magnetic recording head moves onto the magnetic recording medium at the time of the start-up of the magnetic recording device, or a time point after accesses are not made to the magnetic recording device for a predetermined mount of time or longer, and the magnetic recording head moves to a refuge position.

A magnetic recording device according to the present invention comprises: a test data write current applying unit applying an electric current for writing low-frequency test data to a magnetic recording head at a time point when data is not actually recorded; and a magnetic recording head fault detecting unit detecting the proper/improper operation of the magnetic recording head by determining whether or not the terminal voltage of the magnetic recording head, which corresponds to the electric current for writing test data, is within a predetermined range.

Or, a magnetic recording device according to the present invention comprises: a direct current applying unit applying a direct current to a magnetic recording head at a time point when data is not actually recorded; and a magnetic recording head fault detecting unit detecting the proper/improper operation of the magnetic recording head by determining whether or not the terminal voltage of the magnetic recording head, which corresponds to the direct current, is within a predetermined range.

As described above, according to the present invention, the proper/improper operation of a magnetic recording head is detected by applying an electric current to the magnetic recording head at a time point when data is not actually recorded, and by determining the level of the terminal voltage of the magnetic recording head.

Hereinafter, preferred embodiments according to the present invention will be described by referring to the drawings.

Figure 4:
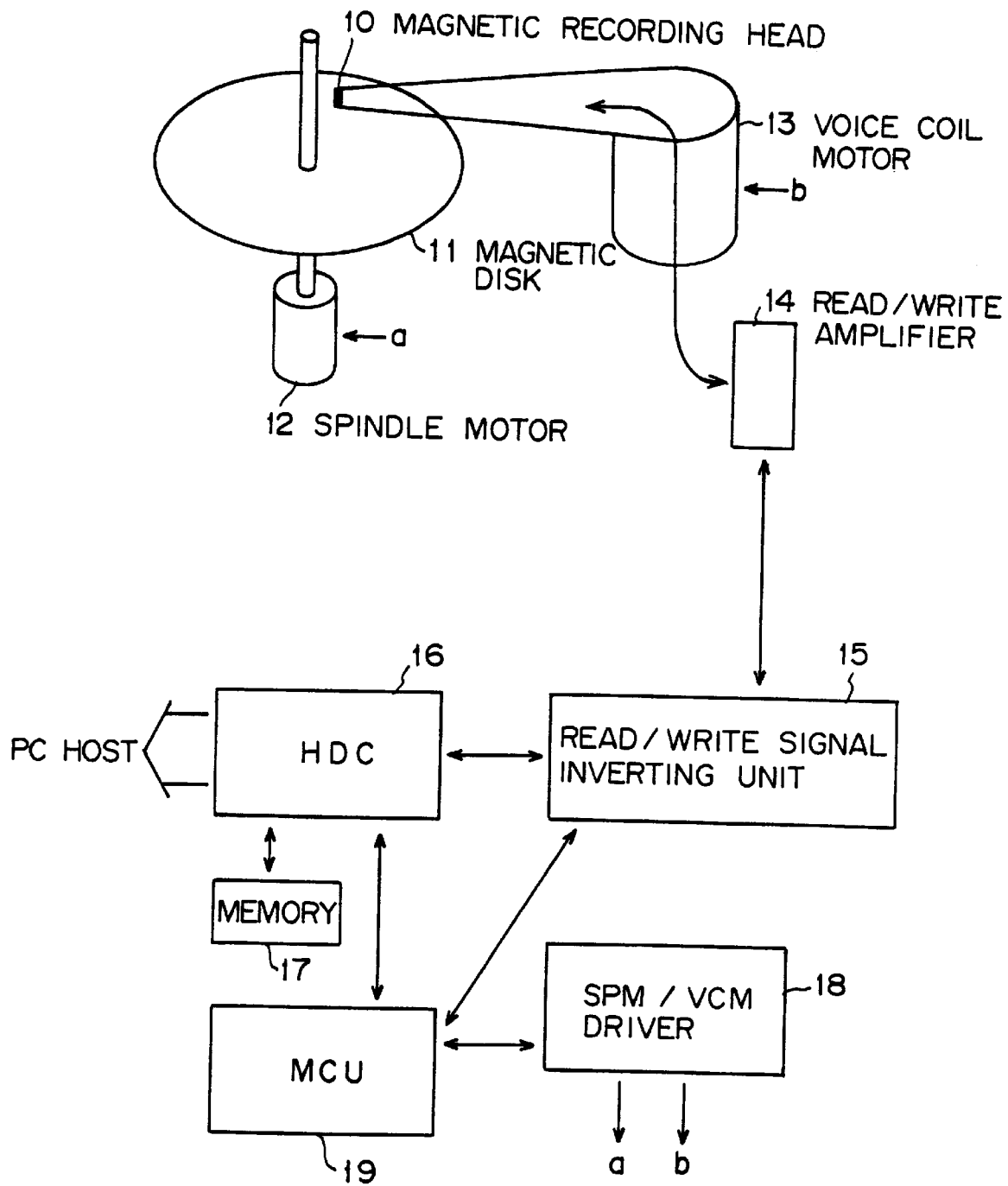
FIG. 4 is a schematic diagram showing the outline of the configuration of a hard disk drive to which a fault detection method according to the present invention is applied.

FIG. 4 shows the outline of the configuration of a magnetic recording device such as a hard disk drive (HDD), to which the method detecting a fault of a magnetic recording head according to the present invention is applied. In this figure, a magnetic recording head 10 moves onto a magnetic disk 11, which is rotated by a spindle motor (SPM) 12. Additionally, the position of the magnetic recording head 10 is controlled by the rotation of a voice coil motor (VCM) 13.

A read/write signal of the magnetic recording head 10 is exchanged with a read/write signal inverting unit 15 via a read/write amplifier 14. Additionally, a read/write signal from/to the read/write signal inverting unit 15 is exchanged, for example, with a personal computer (PC) host side via a hard disk controller (HDC) 16.

The signal control by the HDC 16 is performed with the use of a memory 17. The operations of the HDC 16 and the read/write signal inverting unit 15 are controlled by a micro-controller (computer) unit MCU 19. The rotations of the spindle motor 12 and the voice coil motor 13 are controlled by the MCU 19 via a SPM/VCM driver 18.

FIG. 5 is a flowchart showing the entire process of the method detecting a fault of a magnetic recording head, according to the present invention. In this figure, data input, for example, from a personal computer host side is fed to the HDC 16 shown in FIG. 4 in step S0. It is determined whether or not this data input is not fed for a predetermined amount time or longer in step S1. If the result of this determination is "NO", that is, if the data input is fed, low-frequency data is appended to normal data to be written in step S2, and the data is written to a gap within a sector in step S3 as will be described later. Then, fault detection is made in step S6.

If the data input is not fed for the predetermined amount of time or longer ("YES" in step S1), the head moves to a refuge position to be described later or an area to which test data is written, that is, a dummy area (test area) in step S4. Then, the test data is written to the refuge position or the dummy area in step S5, and fault detection is made in step S6.

Instep S6, a fault of the magnetic recording head, that is, an open or a short circuit is detected in accordance with the flow of FIG. 10 with the detection circuit that is shown in FIG. 9 and will be described later. If a fault is not detected, the operations in and after step S1 are repeated. If a fault is detected, a Fault signal as a fault detection signal is output in step S7. Here, the process is terminated.

Note that it is determined that a data input is not made from the PC host side for a predetermined amount or longer in step S1. To be more specific, it is determined by the MCU 19 whether or not the data input from the PC host side to the HDC 16 is not made for a predetermined amount of time or longer in FIG. 4.

Figure 6:
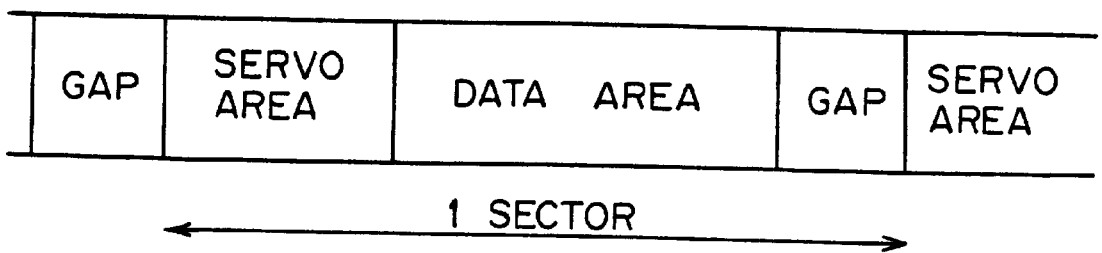
FIG. 6 explains the structure of one sector of a magnetic disk.

FIG. 6 explains the structure of a sector as the minimum unit of a data storage area on a magnetic disk. In this figure, one sector is composed of three portions such as a servo area for detecting whether or not a magnetic recoding head stays in a proper sector position to which the head is to write data, a data area to which data is actually written, and a gap being a sector boundary, to which dummy data is normally written.

In the preferred embodiment according to the present invention, the proper/improper operation of the magnetic recording head is detected by applying an electric current for writing test data or a direct current to a magnetic recording head when the head stays in a gap which is a boundary between sectors and dummy data is conventionally written to, and by determining whether or not the terminal voltage of the head is within a predetermined range, for example, between the levels 1 and 2 explained by referring to FIGS. 1A and 1B. In this case, even with the low-frequency test data, it is sufficiently possible to write, for example, the data having the waveform explained in FIG. 1A to the gap over several hundred or several thousand cycles or more, and fault detection can be properly made by detecting a fault of the head at a time point when a flyback period elapses, for example, at a time point (1) shown in FIG. 1A.

Figure 7:
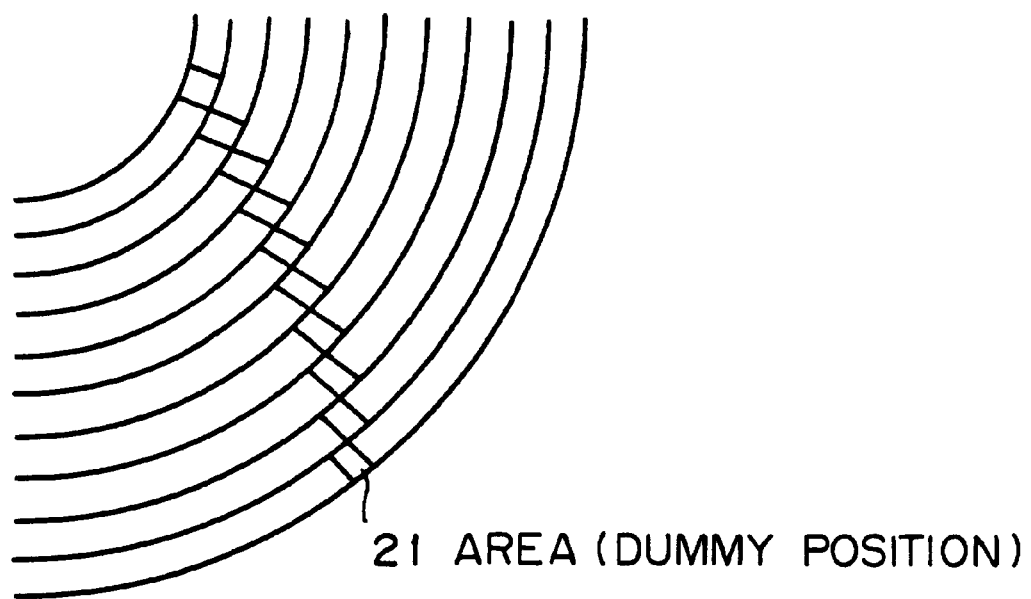
FIG. 7 explains a dummy position to which test data is written on a magnetic disk.

In the preferred embodiment according to the present invention, the time point when an electric current for writing test data or a direct current is applied to a magnetic recording head maybe, for example, a time point when the head stays in a dummy location to which test data is written, other than a time point when the head stays in a gap, which is explained by referring to FIG. 6. FIG. 7 explains sectors (or a portion of a sector) as such a dummy location. In this figure, an area 21 is, for example, one or a plurality of sectors, or a portion of one sector. The electric current for writing test data or a direct current may be applied to the data area within the sector(s) also at a time point when the head stays in the area 21.

Figure 8:
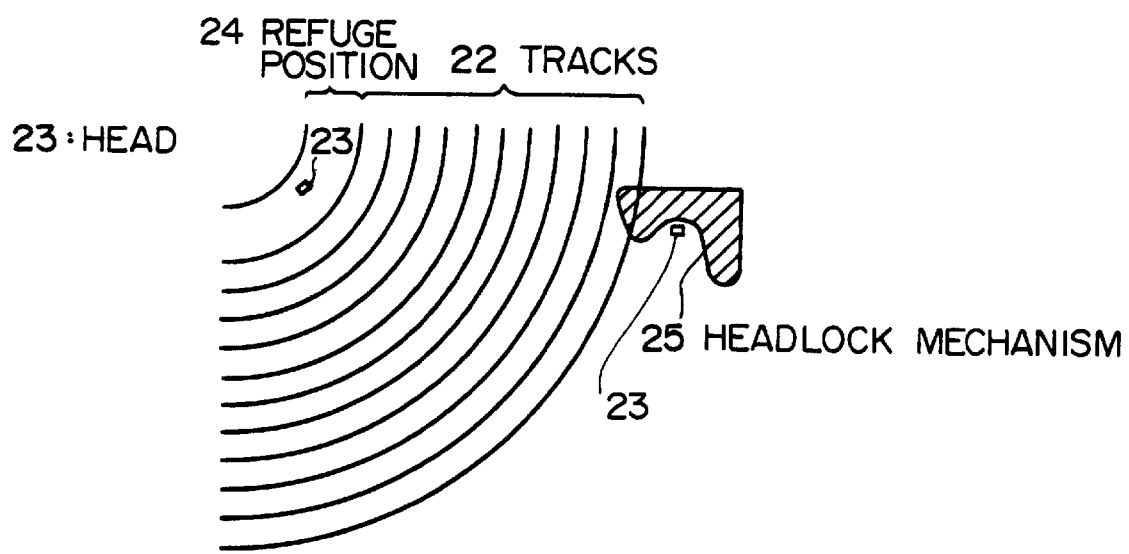
FIG. 8 explains the refuge position of a magnetic recording head for writing test data on a magnetic disk.

FIG. 8 explains the position of a magnetic recording head at a time point when an electric current for writing test data or a direct current is applied in another preferred embodiment. In this figure, sectors to which correct data is normally written exist on tracks 22. However, correct data is not written, for example, to the innermost portion of the magnetic disk, and a refuge position 24 to which the head can move is arranged in this portion. If accesses such as a data input, etc. are not made to a magnetic recording device for a predetermined amount of time or longer as described above, a magnetic recording head 23 is moved to the refuge position 24, and the electric current for writing low-frequency test data or a direct current is applied to the head, and the terminal voltage of the head is detected, so that a fault of the head is detected.

In FIG. 8, a headlock mechanism 25 is arranged, for example, in the outermost portion of the magnetic disk, and is intended to lock the magnetic recording head at this position. When the magnetic recording device starts up, the magnetic recording head is locked, for example, at this position or the above described refuge position. The fault of the head can also be detected by applying the electric current for writing test data or a direct current to the magnetic recording head before the head moves onto the magnetic disk, and by detecting the terminal voltage of the head.

FIG. 9 exemplifies the configuration of a fault detecting circuit of a magnetic recording head. In this figure, a window comparator 30 and an FF (flip-flop) 31 are circuits for detecting a short circuit of a magnetic recording head, whereas a window comparator 32 and an FF 33 are circuits for detecting an open circuit of the head. The two comparators 30 and 32 respectively feed to the FFs 31 and 33 "L" if an input voltage is between the levels 1 and 2 explained by referring to FIGS. 1A and 1B, and "H" if the input voltage is not between the levels 1 and 2.

Actually, the peripheral circuit of a write head coil 34 is more complex than that shown in FIG. 9. However, only the operations performed when a fault is detected are described by being limited to the case where a direct current is applied. When a fault is detected, switches 35 and 36 are turned on, and an electric current is applied to the write head coil 34 by an electric current source 37 inserted in a power source side, and by an electric current source 38 inserted in a ground side.

If the write head 34 is short-circuited, an actual explanation becomes complex. For ease of explanation, it is assumed that the internal impedance of the electric current source 38 is considerably smaller than that of the current source 37. The potential at a connection point "X" on the right side of the coil 34 approaches "0", and becomes lower than the level "1", so that a signal indicating fault detection is output from the FF 31.

In the meantime, if the coil 34 is open-circuited, the potential at a connection point "Y" on the left side of the coil 34 approaches the power source voltage, and becomes higher than the level 2, so that the fault detection signal is output from the FF 33. The fault detection signal is output from the FF 31 or 33, whereby the fault detection in step S6 of FIG. 5 is made.

Figure 10:
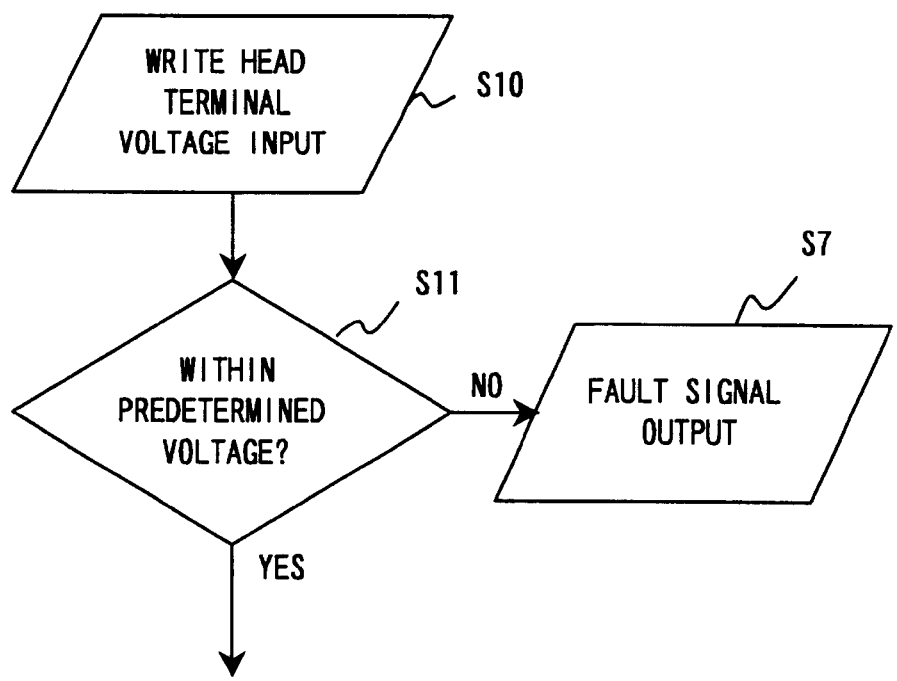
FIG. 10 is a flowchart showing the process detecting a fault of the magnetic recording head.

FIG. 10 is a flowchart showing the fault detection process. In this figure, the terminal voltage of the write head, that is, the terminal voltage of the write coil explained by referring to FIG. 9 is input in step S10. Then, it is determined whether or not this voltage is within a predetermined range in step S11. If the result of the determination is "NO", that is, if the voltage is out of the predetermined range, a Fault signal is output in step S7 of FIG. 5. If the voltage is within the predetermined range, the operations in and after step S1 of FIG. 5 are repeated.

Note that low-frequency test data is written in step S3 or S5 in FIG. 5. However, it is possible to alternatively apply a direct current as explained by referring to FIG. 9, as a matter of course.

The above provided explanation refers to the preferred embodiments by taking a hard disk drive as an example of a magnetic recoding device. However, the present invention is not limited to a hard disk, and is naturally applicable also to all of recording devices using magnetism, such as a magneto-optical disk, an MD, etc.

As described above in detail, according to the present invention, a fault of a magnetic recording head can be properly detected regardless of the data transfer speed of a magnetic recording device by detecting a fault of the head at a time point when data is not actually recorded. Consequently, a fault of a magnetic recording head, that is, an open or a short circuit can be properly detected even if the flyback period of the terminal voltage of the head becomes almost equal to or longer than the data inversion cycle due to an increase in the data write speed of the magnetic recording device. This greatly contributes to the improvement in the reliability of the magnetic recording device.

What is claimed is:

1. A method detecting a fault of a magnetic recording head of a magnetic recording device, comprising:

applying an electric current for writing low-frequency test data to the magnetic recording head at a time point when data is not actually recorded; and detecting a proper/improper operation of the magnetic recording head by determining whether or not a terminal voltage of the magnetic recording head is within a predetermined range.

2. The method according to claim 1, wherein the time point when data is not actually recorded is a time point when the magnetic recording head stays in a gap within a sector of a magnetic recording medium.

3. The method according to claim 1, wherein the time point when data is not actually recorded is a time point when the magnetic recording head stays at a dummy position to which test data is written on a magnetic recording medium.

4. The method according to claim 1, wherein the time point when data is not actually recorded is a time point before the magnetic recording head moves onto a magnetic recording medium when the magnetic recording device starts up.

5. The method according to claim 1, wherein the time point when data is not actually recorded is a time point after accesses are not made for a predetermined amount of time or longer, and the magnetic recording head moves to a refuge position.

6. A method detecting a fault of a magnetic recoding head of a magnetic recording device, comprising:

applying a direct current to the magnetic recording head at a time point when data is not actually recorded; and detecting a proper/improper operation of the magnetic recording head by determining whether or not a terminal voltage of the magnetic recording head is within a predetermined range.

7. The method according to claim 6, wherein the time point when data is not actually recorded is a time point when the magnetic recording head stays in a gap within a sector of a magnetic recording medium.

8. The method according to claim 6, wherein the time point when data is not actually recorded is a time point when the magnetic recording head stays at a dummy position to which test data is written on a magnetic recording medium.

9. The method according to claim 6, wherein the time point when data is not actually recorded is a time point before the magnetic recording head moves onto a magnetic recording medium when the magnetic recording device starts up.

10. The method according to claim 6, wherein the time point when data is not actually recorded is a time point after accesses are not made for a predetermined amount of time or longer, and the magnetic recoding head moves to a refuge position.

11. A magnetic recording device having a magnetic recording head, comprising:

a test data write current applying unit applying an electric current for writing low-frequency test data to the magnetic recording head at a time point when data is not actually recorded; and a magnetic recording head fault detecting unit detecting a proper/improper operation of the magnetic recording head by determining whether or not a terminal voltage of the magnetic recording head, which corresponds to the electric current for applying test data, is within a predetermined range.

12. A magnetic recording device having a magnetic recording head, comprising:

a direct current applying unit applying a direct current to the magnetic recording head at a time point when data is not actually recorded; and a magnetic recording head fault detecting unit detecting a proper/improper operation of the magnetic recording head by determining whether or not a terminal voltage of the magnetic recording head, which corresponds to the direct current, is within a predetermined range.

* * * * *